Nov. 30, 1965 G. BIRKEL, JR 3,221,155

HYBRID COMPUTER

Filed Nov. 25, 1959 5 Sheets-Sheet 1

INVENTOR
GEORGE BIRKEL, Jr.

BY Hurvitz & Rose

ATTORNEYS

Nov. 30, 1965 G. BIRKEL, JR 3,221,155

HYBRID COMPUTER

Filed Nov. 25, 1959 5 Sheets-Sheet 2

INVENTOR
GEORGE BIRKEL, Jr.

BY Hurvitz & Rose

ATTORNEYS

HYBRID COMPUTER

Filed Nov. 25, 1959

INVENTOR
GEORGE BIRKEL, Jr.

BY Hurvitz + Rose

ATTORNEYS

INVENTOR
GEORGE BIRKEL, Jr.

BY Hurvitz & Rose
ATTORNEYS

INVENTOR
GEORGE BIRKEL, Jr.
BY [signature]
ATTORNEYS 3,221,155

HYBRID COMPUTER

George Birkel, Jr., Eau Gallie, Fla., assignor to Radiation, Inc., Melbourne, Fla., a corporation of Florida Filed Nov. 25, 1959, Ser. No. 855,377
22 Claims. (Cl. 235—154)

The present invention relates to hybrid computers and more particularly to hybrid computers employing floating point arithmetic.

It has been demonstrated in the prior art that the processes of digital-to-analog conversion and analog-to-digital conversion necessarily contain the functions of multiplication and division, respectively, and apparatus which employ these conversion units to effect mathematical computations are known as hybrid computers. In normal operation, a conversion unit of either type utilizes a reference voltage which is held stable and conversion from one mode to the other is of absolute values and is wholly dependent upon the stability and value of the reference voltage. It is apparent that changes in the output signal for either conversion apparatus can be effected through a variation in the reference voltage. These variations, in the case of the digital-to-analog converter, result in a direct multiplication in which the output analog voltage is directly proportional to the reference voltage as well as to the input digital value. In the case of analog-to-digital conversion, variations in the reference voltage cause an inverse proportionality between the reference and the analog signals so that the input analog quantity is divided by the reference analog quantity.

It further develops that the processes of conversion are such that high speed serial and parallel additions and subtractions can be effected simultaneously therewith. Specifically, combinations of multiplication and addition or subtraction can be effected in fifteen to twenty microseconds and the process of division with addition or subtraction can be effected in approximately forty or fifty microseconds. Actually, the conversion processes determine the speed of operation while the concurrent additions or subtractions add only nominally to the interval required for the basic conversion functions. Accuracies of the hybrid computer are of the same order of magnitude as those for straight conversion processes; that is, plus or minus 0.1 percent and therefore, the hybrid computer operates faster than a digital computer and with higher accuracies than those obtainable with a wholly analog system. The result is a true hybrid apparatus possessing overall characteristics which cannot be obtained through the independent utilization of either analog or digital techniques.

The efficient utilization of analog-to-digital techniques in a hybrid computer results in the ability to utilize high speed computations "on-line." The advantages of high speed on-line computations are immediately obvious for process control applications and for the routine processing of instrumentation data. At the present time, process control by means of computers has been limited either due to slow operating speeds and high cost of the digital system or the limitations on accuracy imposed by the conventional analog systems. An additional advantage of the hybrid-type computer is that not only is the computer rapid in its operations and accurate but also it may be fabricated with comparatively inexpensive and reliable standard components which render the entire system wholly economical and dependable.

As indicated above, the hybrid computer has a high degree of accuracy which is, in effect, the accuracy which can be achieved by an analog-to-digital or digital-to-analog converter and is of the order of magnitude of plus or minus 0.1%. This accuracy of the conversion units is maintained, however, only so long as the reference voltage applied thereto is held within certain predetermined limits. Specifically, system accuracy can be maintained only if the reference voltages applied to the converters vary only between a maximum voltage for which the system is designed and approximately one-half this value. If the reference voltage applied to either type of converter falls below one-half this design value, the accuracy of the system rapidly deteriorates and one of the prime advantages of this type of apparatus is lost along with reliability of the answers. However, an apparatus of the type described which is to be employed in on-line applications may have to handle input quantities which vary over wide ranges of values while maintaining system accuracy. For example, any function which varies in an exponential sense requires a wide range of values to define the function. A great many physical and engineering problems require the use of functions which vary exponentially and typical areas in which such conditions arise are in the field of nuclear physics, space technology, operations research, statistical prediction problems, and general statistical operations. In problems in which the functions vary exponentially, it is often difficult to predict ahead of time which terms of the function will be of significance in the final value. For instance, in a complete nuclear monitoring system, just such a problem is encountered. In some cases, the energy transport and perturbation problems require rather sizable changes of range in order to specify the problem. This is particularly true if one has a heterogeneous configuration or a multi-region but essentially homogeneous system with various types of coolants, reflectors and fuels which are heterogeneous with respect to each other. As indicated above, it is often difficult, if not impossible, in such problems to recognize which numbers will be of importance in the final answer. Some terms whose comparative magnitude is quite small may well be the only terms left after the required additions and subtractions have been performed and, to complicate matters, such problems require the sum or difference of a great many products. Since it is not possible to determine what terms will be of significance, it is necessary to preserve as much of the information as possible, particularly with respect to small terms and without a loss of accuracy as a result of operations thereupon.

In the prior art hybrid systems, where the accuracy of the system could be maintained only so long as the range of numbers was maintained within a value of one-half the reference value for which the conversion systems were designed, much information was completely lost and other information was computed with a high degree of inaccuracy. In those problems where such terms became the significant terms in the answer, the system either failed completely or produced information of dubious value.

It is therefore a primary object of the present invention to provide a hybrid computing system which is capable of handling a wide range of absolute values of numbers while maintaining system accuracy regardless of the absolute value of the input quantities and the answers produced as a result of operations of the computer.

It is another object of the present invention to provide a hybrid computer capable of handling a wide range of numbers in which the absolute value of the signals representing various numbers are maintained within predetermined limits by multiplying or dividing the voltage representations or digital representations of the numbers by factors which maintain these representations within predetermined limits and in which a multiplication and division factor are separately stored so that subsequently the numbers may be converted to their true values or may be read out from the computer along with the stored multiplication and division factors so that the numbers may be reconverted externally of the equipment.

It is another object of the present invention to provide a hybrid computer having a section for producing multiplication, division, addition and subtraction of a real number portion of a computer word and having a second section which stores information relating to the exponents of the various numbers appearing in the numerical portion of the system and which further permits addition and subtraction of the exponents upon multiplication and division, respectively, of the real number portions of the word.

It is another object of the present invention to provide a hybrid computer in which analog input voltages are multiplied or divided by known factors upon introduction into the apparatus in order to maintain the voltages within predetermined limits for maintaining system accuracy and in which the factors by which the numbers are multiplied or divided are maintained in a separate portion of the system and in which the exponent factors are employed to control converse operations upon the numbers by the machine in order to return the numbers to their original numeric values whenever it is necessary to perform an addition or subtraction function.

In accordance with the present invention, there is provided a hybrid computer in which all computer words include a significant digit or real number section, and an exponent section thereof. In order to perform operations upon both portions of the computer word, the computer includes two basic data handling systems, one for performing mathematical operations upon the real numbers and the other for storing and performing addition and subtraction operations upon exponents associated with each of the numerical quantities present in the real number or numeric section of the machine. The system for adding and substracting exponents is a wholly digital system and the exponents in this system are to the base 2 and are represented in the binary notation. As an example, consider the number $5 \times 2^4$ which is equal to 90. In the present invention for reasons to be explained subsequently, the significant numbers are stored as numbers between ½ and 1. In the example, the exponent section of the computer has stored in an appropriate register the binary number 00111 representing the exponent of the base 2 and in an appropriate register in the numeric section of the apparatus, there is stored the binary number .1100110; that is, .7969 or approximately 0.8.

As indicated above, in performing a multiplication or division function, electrical quantity representing the number must be maintained within the limits of value required for maintaining system accuracy and if this number is below or above the minimum or maximum permissible values, the number is multiplied or divided, respectively, by a factor bringing it to within the range of permissible values. The number by which the real number is multiplied or divided is stored in the exponent portion of the system and when the real number is multiplied by some further number also having an exponential portion, the two exponents are added algebraically in the exponent section of the computer and the answer is stored for further reference. If a division operation is performed, the exponents stored in the exponent section of the computer are subtracted algebraically and the answer is also stored. If the final answer of a computation is read out of the machine in digital form, the digitized real number plus the digit representing the exponent may be read out concurrently, or if desired, the real portion of the number can be converted to its true value and then read out. Although multiplications and divisons may be performed with numbers having different exponents, it is mandatory that these numbers not be added or subtracted from one another and therefore, whenever an addition or subtraction must be performed, the real numbers must be converted to numbers having equal exponents. Such an operation is under the control of the exponent section of the machine which compares the exponents of the words to be added or subtracted and operates upon the numbers until the exponents agree.

In order to maintain accuracy during a conversion process, both the analog voltage and binary number applied to the converter during a multiplication or division operation must fall within minimum and maximum predetermined values for which the converter is designed. Such requirements are readily met in the present invention with respect to binary numbers by employing a number system in which the binary number is always less than one and in which the most significant digit of each word is maintained, during multiplication and division operations, at the digit location immediately to the right of the binary point. In consequence, a word having ones in all digit locations has a value, if the exponent is disregarded, of slightly less than one and a word having only a single one has a value of one-half. Since only the real number portions of the word are applied to the conversion units during a multiplication or division operation it is seen that the numeric requirements imposed upon the machine to maintain system accuracy are met. With regard to maintaining the analog quantities at the proper value, both those which are derived in the machine by a conversion process from digital numbers and the input analog quantities, may be compared with a reference voltage immediately upon introduction into the machine and are multiplied or divided as required.

Analog multiplication or division is by a factor of two and whenever such an operation takes place an increment or decrement signal is sent to a storage register in the exponent section of the apparatus in which the exponent information for that voltage is stored. Multiplication of a binary number in order to bring it within the range of one-half to one is accomplished by applying the number of a shift register and shifting it to the left until its most significant digit is located in the most significant stage of the register. Each shift is a multiplication of the number by 2 and the exponent information for the number is obtained by counting the number of shifts to which the number is subjected and storing this number in an appropriate register in the exponent section of the machine. The value of the real number portion of the digital word must now lie between one-half and one and conforms to the requirements of the reference applied to the converters. In consequence, all the digital numbers in the system may be maintained within required tolerances by simply applying the digital numbers to a shift register and shifting until a one appears in the most significant digit location. This operation is hereinafter referred to as "normalizing" the word. By counting the number of shifts required to obtain this latter condition, the exponent of the number is immediately available and this number may be stored in a register in the exponent portion of the apparatus. The exponent section of the computer stores the exponent in binary number form as the exponent of two. Specifically, if a number, for instance, is equal to $0.5 \times 2^6$, the number stored in the exponent section of the apparatus is a binary number equal to six or 0110. The exponent registers are able to accommodate five numbers plus an exponent sign so that the highest exponent which may be stored is thirty-one and therefore, the largest number which the apparatus is capable of storing is equal to $0.n \times 2^{31}$ which is obviously quite a large number ranging in the millions. On the other hand, the number may be as small as $0.n \times 2^{-31}$ which obviously would reduce the number to a value of substantially zero. The reason for storing the number as the exponent of two is that in the shift process previously described for bringing the most significant digit of each binary number immediately to the right of the decimal point, each shift represents a multiplication by two and thus each shift towards the binary point adds a minus one to the exponent of two. Also, the division of the input analog quantity, if it is greater than the reference for which the converters are designed, is by a factor of two so that when such a division is required, a number may be directly stored in the exponent section of the computer which is equal to an exponent of two. In such a case, the exponent is positive since the quantity now applied to the machine is equal to the quantity $n \times 2$ to a positive exponent.

In order to add positive and negative numbers such as the positive and negative exponents, the true twos complements of one of the numbers may be stored; for instance, the exponents representative of the shifting operations may be stored in their true form whereas the number representative of multiplication by one of a positive exponent which resulted from a division of the input analog quantity by two may be stored as its complement so that when it is necessary to add this exponent to other exponents in the system, a subtraction actually occurs. Similarly, if a division is required of the system, thereby requiring a subtraction of exponents, the complement of the exponent of the denominator is normally employed so that the subtraction can be effected by addition of complements.

The computer of the present invention is primarily a special purpose computer and normally the logic is arranged such that it performs a single repetitive or group of repetitive operations. In the computer described in the present application, a relatively simple problem is undertaken and relates to the solution of the equation $$N=\frac{X(Y+C)}{Z}$$

The quantity X is applied to the apparatus as an analog quantity which is converted to digital form and Y and Z are applied to the apparatus directly in digital form. The quantity C is a constant of the circuit and stored in digital form in the apparatus and is called forth whenever it is necessary to add the quantity to Y. The above equation permits presentation of the steps required for each type of basic operation the apparatus is capable of performing; namely, multiplication and division. Subtraction is not illustrated directly in the main process but since a division operation is required, a subtraction is performed in the exponent section of the apparatus and since the adder for the real numbers and the exponent numbers are identical, the operation of this portion of the circuit is adequately described.

The computer employs a basic clock rate of two megacycles per second and a cycle of operation of the computer requires fifty microseconds. Therefore, the basic cycle requires the generation of one hundred distinct clock pulses. The analog-to-digital conversion is the largest function timewise performed by the apparatus and requires forty microseconds or eighty clock pulses. The sequencing of the information to the machine in solving the above problem is initially to feed in the quantity X to the analog-to-digital converter and concurrently therewith feed in the Y quantity to an input register. The Y quantity is thereafter gated to a shift register which permits the quantity to be shifted to the left towards its binary point until a one is stored in the most significant digit of the register; that is, normalized. The Y information is thereafter gated to an adder where it is added to the quantity C after one of the numbers has been shifted to bring their exponents into agreement. This operation is under control of the exponent section of the computer which performs a comparison between the exponents of the Y and C numbers and decides which is larger and which of the numbers must be shifted to bring the exponents into concurrence. During addition of the $Y+C$ numbers, the Z input quantity, in digital form, is brought into the apparatus, normalized, and thereafter applied to a digital-to-analog converter where it is stored until the number is subsequently required. The $Y+C$ number which is now available from the adder is applied back through the input shift register where it is normalized. Thereafter, the quantity is gated to another digital-to-analog converter where the information is stored until subsequently required. About this time the input quantity X has been converted to binary form and is applied through the shift register where it is normalized and then fed to a third digital-to-analog converter. The analog $Y+C$ quantity, available from the second mentioned digital-to-analog converter, is applied as a reference to the digital-to-analog converter to which the X quantity is applied and the output of this latter converter is equal to $X(Y+C)$. This quantity is now applied as an analog input quantity back through the input section of the apparatus and is thence applied to the analog-to-digital converter. The Z quantity is now applied to the analog-to-digital converter as the reference voltage and at the end of another conversion cycle, the output digital number from the analog-to-digital converter is equal to $$\frac{X(Y+Z)}{Z}$$

which is the final quantity the machine is to derive and concurrently with the operation of the real number portion of the computer the exponent number portion has operated upon the various exponents derived from the shift register and the input analog division apparatus and variously added these numbers directly or as complements to effect the required exponent manipulations in order to provide the exponent for the final output quantity of the machine. The output quantity may be normalized prior to gating to output buffer stages or the quantity may be fed to an output circuit directly from the analog-to-digital converter with the number representative of the exponent of the base 2 also employed as an output unit of information.

It is seen that the exponent and real number portions of the computer are operating concurrently and, in fact, in the example given and in most examples which would be considered, the exponent section of the machine has its answers available more rapidly than the real number section of the apparatus. With regard to the real number section of the computer, various addition, subtraction and multiplication operations can occur during the cycle of the analog-to-digital converter which converter requires the longest interval of time for operation and which determines the basic operating cycle of the computer.

It is another object of the present invention to provide a hybrid computer employing floating point arithmetic so that all numbers or all quantities employed in multiplication and division processes, fall within predetermined limits lying well within the capabilities of the conversion apparatus employed for multiplication and division.

It is still another object of the present invention to provide a hybrid computer employing floating point arithmetic in which the exponents of the various real numbers to the base 2 are stored in an exponent portion of the machine and are subjected to additions and subtractions during the intervals when the real number section of the apparatus is performing various mathematical functions upon the real number portions of each computer word.

The above and still further objects, features and advantages of the present invention will become apparent upon consideration of the following detailed description of one specific embodiment thereof, especially when taken in conjunction with the accompanying drawings, wherein.

Figure 1:
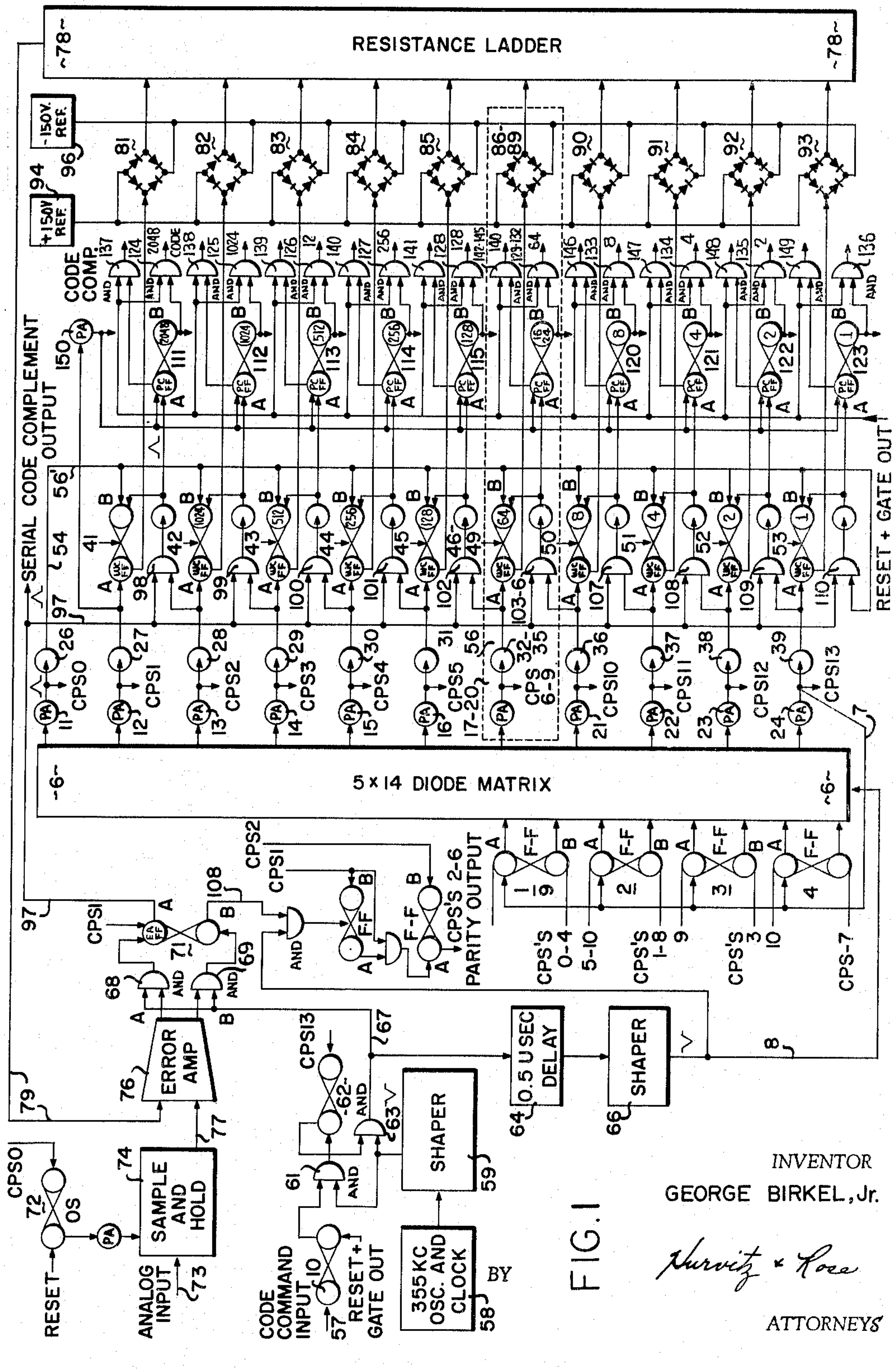
FIGURE 1 is a schematic block diagram of an analog-to-digital converter which may be employed in the apparatus of the invention.

Referring specifically to FIGURE 1 of the accompanying drawings, there is illustrated a schematic block diagram of an analog-to-digital converter which may be employed in the apparatus of the present invention. The primary function of the analog-to-digital converter is to produce a thirteen bit binary code group for each input data sample and for each result of a division of one quantity by another quantity. The thirteenth or least significant bit of the code is not normally employed by the remainder of the circuit. The converter is of the feedback type employing the "half-split" coding technique. With this method of operation, an information sample is sequentially compared with precision binary weighted voltages generated within the converter. The first comparison is made at 50 percent of full scale voltage and if the input signal is less than 50 percent full scale, the converter removes the weighted voltage and generates a "no" bit for the code. The second comparison is made at 25 percent of full scale voltage and if the input signal is greater than 25 percent of full scale, the converter retains the weighted voltage and generates a "yes" code bit. This comparison continues for twelve comparison levels and the twelve decisions and the answers to the twelve decisions thus made form the binary code.

Fourteen sequential pulses (CPS's) are required in the generation of each twelve bit code words. These sequential pulses are generated by a fourteen-stage logic type counter consisting of four flip-flops 1, 2, 3 and 4 and a five-by-fourteen diode matrix 6.

In operation of the generator, the occurrence of a CPS 13 bit on a lead 7 resets the four flip-flops 1 through 4 to their original or zero state. CPS 0 pulse is also applied via a lead 9 to the flip-flop 1 and advances the counter comprising the flip-flops 1 through 4 by one. The next 355 kilocycle bit is applied to the matrix 6 and causes the production of CPS 1 which is applied to the flip-flop 2 and again advances the counter. This pulsing of the second stage of the counter with the CPS 1 bit produces a false count of 2 which forms a gray code of 0011. The third bit on the lead 8 causes the generation of CPS 2 and all succeeding pulse counts are a standard gray code. The fourteenth 355 cycle pulse (CPS 13) always resets the counter and the counter remains reset until a command is received by a flip-flop 10 to initiate a coding operation whereupon the cycle is repeated. The various output pulses from the matrix 6 are amplified by pulse amplifiers 11 through 24 and are applied via emitter follower amplifiers 26 through 39 respectively, to each lefthand stage of a group of flip-flops 41 through 53. In each of the designations of the pulse amplifiers, the emitter followers and the flip-flops, the single unit lying within the dashed line 56 represents four of the corresponding units, this notation being employed to reduce the size of the diagram. The pulse from the emitter follower 26 is applied via a lead 54 to a further lead 56', the purpose for which will become apparent subsequently.

A coding cycle is initiated by a code command input pulse applied to the flip-flop 10 via a lead 57. This input is received from an operating synchronizing generator at a 20 kc. rate. The code command pulse causes the flip-flop to switch conduction of its tubes and permits passage of the next occurring 355 kc. clock pulse, from a generator 58 and shaper 59, through an and gate 61 to a command flip-flop 62. The flip-flop 62 remains in the on state until reset by the CPS 13 pulse. The command flip-flop therefore, remains on during the occurrence of fourteen clock pulses. The turning on of this flip-flop permits the first 355 kc. bit to be applied to the lead 8 in order to start cycling of the system. More specifically, an output voltage is derived from the demand flip-flop 62 and applied to an and gate 63 permitting the and gate to pass 355 kilocycle pulses therethrough and to a half microsecond delay line 64. The output voltage derived from the delay line 64 is applied to the lead 8 via a shaper 66. The pulses passed by the and gate 63 are also applied via a lead 67 to a pair of amplifier and gates 68 and 69, the output pulses derived therefrom being applied to opposite stages of a decision flip-flop 71. The CPS 0 pulse which is generated upon the application of the first 355 kc. pulse to the CPS generator via lead 8 is applied to an inut control flip-flop 72 which permits an analog input voltage appearing on a lead 73 to be gated to a sample and hold circuit 74 which applies the analog voltage thus detected to an error amplifier 76 via a lead 77. The voltage appearing on the lead 77 is compared with a voltage derived from a resistance ladder 78 and applied to the amlifier 76 via a lead 79. The relative values of the signals applied to the leads 77 and 79 control the state of conduction of the flip-flop 71 which forms the decision element of the apparatus.

Returning again to the operation of the apparatus, each of the weighted current flip-flops 41 through 53 controls current flow through a different analog gate 81 through 93 which connect either of two reference supplies 94 and 96, the former plus and the latter minus, to the resistance ladder summing network 78. When the voltage applied to one of the gates from one of the flip-flops 41 through 53 is positive with respect to ground, the gate connects the positive supply 94 to the ladder 78 whereas when the input of the gate is negative, the negative supply is connected to the resistance ladder. Thus, a positive or negative current is produced in the ladder in dependence upon the polarity of the inputs to the gate and therefore, in dependence upon the state of conduction of the flip-flops 41 through 53.

When the CPS 1 pulse occurs, the flip-flops 41 which introduces a weighted current proportional to 2,048 into the resistance ladder 78 is triggered and plus 2,048 units of current are produced at the output of the resistance ladder due to the connection of the positive source 94 to the uppermost ladder input. However, since all of the other flip-flops 42 through 53 are in their off or negative states, their current gates 82 through 93 respectively tie the other ladder inputs to the equal but negative reference source 96. The sum of their effect is to produce a minus 2,047 units of current which leaves a remaining unit of current of one in the resistance ladder.

The pulse CPS 1 also resets the error amplifier flip-flop 71 so that the voltage appearing on its upper output lead 97 is positive. The positive voltage appearing on the lead 97 is supplied to one input of each of a plurality of two input coincidence gates 98 through 110. If the analog input voltage to the error amplifier 76 is less than the voltage appearing on the lead 79 from the resistance ladder 78, the output voltage on the lead 97 from the flip-flop 71 is positive with respect to ground and a lower output lead 108' from the lower stage of the flip-flop 71 has a negative voltage applied thereto. This, in effect, means that if the voltage generated by the resistance ladder is larger than the voltage appearing on the lead 77, the lead 97 has a positive voltage applied thereto whereas, if the converse is true, a negative voltage is applied to the lead 97. In the condition under consideration, the voltage generated at this time by the ladder 78 is greater than the voltage appearing on the lead 77 and therefore a positive voltage is applied to the lead 97. When the CPS 2 pulse appears, it turns on the flip-flop 42 and concurrently resets the flip-flop 41 to its zero or off stage since the and gate 98 has a positive voltage applied thereto via the lead 97. This action removes the plus 2,048 units of current from the ladder 78 since the flip-flop 41 is reset and applies a positive 1,024 units of current to the ladder 78 due to the turning on of the flip-flop 42. The resultant voltage now appearing on the lead 79 is proportional to 1,024 units of current and the lead 79 is switched to a negative voltage if the analog input appearing on the lead 77 is greater than the voltage on the lead 79. The switching of the flip-flop 71 occurs one-half a microsecond prior to the occurrence of the CPS 3 pulse due to the one-half microsecond delay introduced by the delay line 64. The negative voltage appearing on the lead 97 is coupled to all of the and or coincidence gates 98 through 110 and the CPS 3 pulse is applied to the and gate 99 and the flip-flop 43. Since a negative voltage now appears on the lead 97, the CPS 3 pulse is not gated through the and gate 99 and flip-flop 42 is not reset. The state of conduction of the flip-flop 43 is altered so that minus 512 units of current are removed from the ladder 78 and plus 512 units of current are applied thereto. The error amplifier 76 now makes the decision whether the analog input is larger or smaller than a voltage indicative of 1,024 plus 512 units of current in the resistor ladder 78 and the flip-flop 71 is set in accordance with this decision. This process continues through a complete cycle of the pulse generator comprising the four stage binary counter including flip-flops 1 through 4 and the diode matrix 6 and after twelve such comparisons the CPS 0 pulse again resets the flip-flops 41 through 53 to their zero state and a new unit of analog information is gated into the sample and hold circuit 74.

It will be noted that the output voltage of each of the and gates 98 through 110 is applied to a distinct flip-flop 111 through 123. These flip-flops therefore, accumulate a pattern of states of conduction which is the opposite of the positive and negative pattern of voltages developed at various times on the lead 97. This pattern is gated out through output and gates 124 through 136 to a utilization circuit by means of a gate out and reset pulse applied to the gates 124 through 136. Thus pulse also resets flip-flops 10 and 72. The complement of the output code may be derived, if so desired, from a plurality of and gates 137 through 149 which are also opened by the pulse appearing on the lead 58. Reset of the flip-flops 111 through 123 is effected by the CPS 1 pulse via a pulse amplifier 150.

Figure 2:
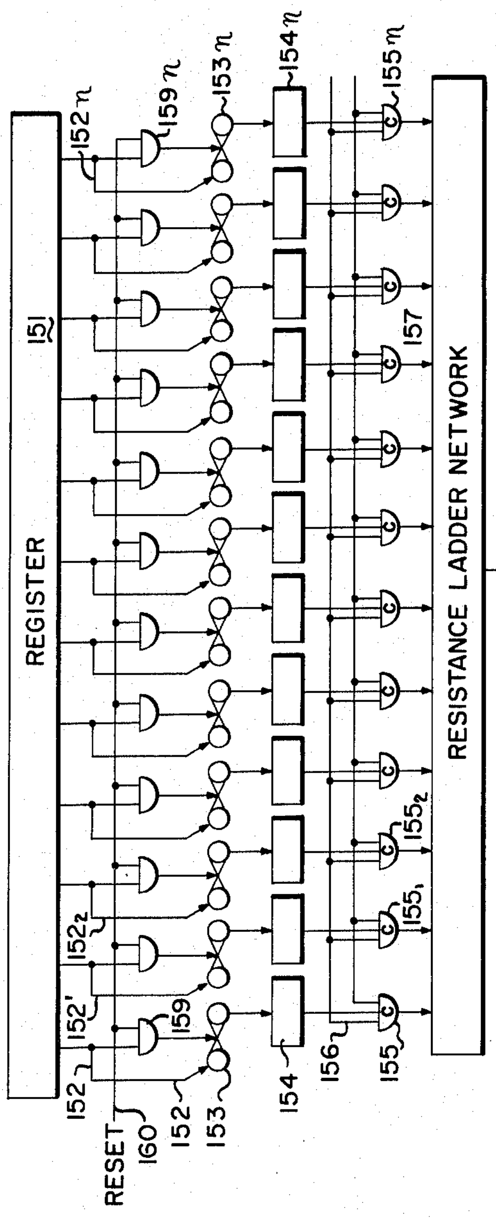
FIGURE 2 is a schematic block diagram of a digital-to-analog converter which may be employed in the apparatus of the invention.

The digital-to-analog converter employed in the present invention constitutes only a portion of the analog-to-digital converter of FIGURE 1. Referring specifically to FIGURE 2 of the accompanying drawings, wherein the digital-to-analog converter is illustrated, input digital information is applied in parallel or series, as the case may be, to an input register 151 which accumulates or stores the input information. The individual bits stored in the register 151 are applied via leads 152, $152_1$, $152_2$ to $152_n$ each to one stage of flip-flops 153, $153_1$, $153_2$, $153_3$ and $153_n$ respectively. Therefore, the pattern of positive and negative pulse originally stored in a register 151 are now stored in the flip-flops 153–$153_n$. The output voltage developed on the right hand stage of each of the flip-flops 153 to $153_n$ is applied through distinct driver amplifiers 154 to $154_n$ to balanced output gates 155 to $155_n$ corresponding to the gates 81 through 92 of FIGURE 1 of the accompanying drawings. These current or analog gates are represented throughout the drawings by conventional gate symbols with a "C" therein. Reference voltages are applied via leads 156 and 157 to the gates 155 through $155_n$ and upon energization of these gates by the various flip-flops 153 through $153_n$, weighted currents are applied to a resistance ladder 158 in correspondence with the pattern of pulses stored in the flip-flops 153–$153_n$. Thus, if the right hand stage of the flip-flop 153 is non-conductive indicating a one, a positive voltage reference is applied to the ladder 158. On the other hand, if the right hand stage is conductive, indicating a zero, a negative reference is applied to the ladder 158.

The output pulses developed on the leads 152 through $152_n$ are also applied to and gates 159 through $159_n$. These gates are supplied with pulses from a reset lead 160 so that when a pulse is applied to the lead 160 a positive pulse is gated through those and gates 159 through $159_n$ which are associated with leads 152 through $152_n$ having a positive pulse applied thereto. In consequence, the flip-flops 153 through $153_n$ which were shifted due to the application of a positive pulse via one of the leads 152 through $152_n$ is now shifted back to its original state of conduction. The output voltage from the resistance ladder, as in the case of the analog-to-digital converter which is applied to an output buffer 160 is proportional to or is indicative of the pattern of pulses applied to the register 151 and therefore the apparatus performs its intended function. If desired, the buffer 160 may comprise a readout gate so that an output voltage is developed only at prescribed intervals.

Figure 3:
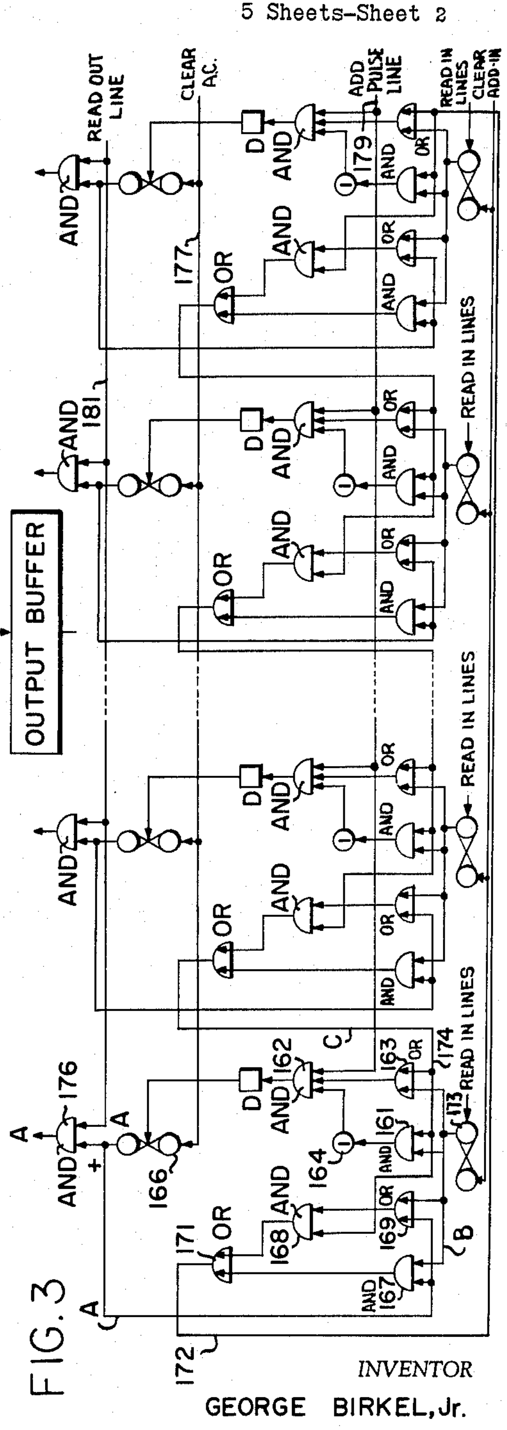
FIGURE 3 is a schematic block diagram of a parallel adder which may be employed.

Referring specifically to FIGURE 3 of the accompanying drawings, there is illustrated a thirteen digit accumulator and add-in register which, with associated logic circuitry, forms a parallel adder. This adder is employed in the present invention for both binary addition and subtraction, subtraction being performed by adding the complement of the subtrahend to the other number of the problem. In the system illustrated, two coincidence gates 161, 162, or gate 163 and one inverter 164 of each stage of the parallel adder are employed to perform the logical function $(A+B)\ (\overline{AB})$. In other words, this group of logic circuits allows the accumulator bit; that is, a bit stored in a flip-flop 166 from a previous word to be complemented if there is either a one in the corresponding add-in bit or if there is a one from the carry circuits of the previous bit but not if there is a one in both. Two and circuits 167 and 168 and two or circuits 169 and 171 perform the logical function $A(B+C)+BC$. This logical group makes a decision as to whether there should be a carry from this bit or not. In other words, if at least two of the possible three "ones" (from the accumulator bit in flip-flop 166, from the add-in bit, or from the previous carry bit) occur, a carry should be propagated.

The thirteenth bit of the adder is used as a sign bit. The output from the carry section of this bit is fed back to the carry progation line of the first bit via a lead 172 to perform end-around carry in the case of subtraction. Also it performs the function of overflow detection in the case of addition and where the adder is employed as a comparator, this carry bit may be utilized to indicate which of the two words is larger.

The operation of the circuit is described now with reference to FIGURE 3 and Table I; the three lefthand letters in Table I indicating the status of the bit for each of the three inputs to the adder; that is, the accumulator bit A which in actuality is the bit of the first word fed to the adder, the bit in the input flip-flop 173 which is the bit of the second word and the carry bit C which appears on a lead 174. The righthand column designated by the letter $C_1$ indicates the condition of the carry generated by the section under consideration while the column $A_1$ indicates the condition of conduction of an output and gate 176 which has applied thereto the output voltage of the flip-flop 166, the accumulator and therefore answer register.

*Table I*

| Input | | | Gates | | | | | | | Output | |
|---|---|---|---|---|---|---|---|---|---|---|---|
| A | B | C | 167 | 169 | 161 | 163 | 168 | 162 | 171 | $A_1$ | $C_1$ |
| 0 | 0 | 0 | --- | --- | --- | --- | --- | --- | --- | 0 | 0 |
| 0 | 0 | 1 | --- | --- | --- | X | --- | X | --- | 1 | 0 |
| 0 | 1 | 0 | --- | --- | --- | X | --- | X | --- | 1 | 0 |
| 0 | 1 | 1 | --- | X | X | X | X | --- | X | 0 | 1 |
| 1 | 0 | 0 | --- | X | --- | --- | --- | --- | --- | 1 | 0 |
| 1 | 0 | 1 | --- | X | --- | X | X | X | X | 0 | 1 |
| 1 | 1 | 0 | X | --- | --- | X | --- | X | X | 0 | 1 |
| 1 | 1 | 1 | X | X | X | X | X | --- | X | 1 | 1 |

X indicates open gate.
$A_1$ indicates condition of flip-flop 166.
$C_1$ carry.

In operation, initially, a clock pulse designated T1 for purposes of illustration is applied to an accumulator clear line 177 and an add-in register clear line 178. Pulse T1, therefore, sets all of the flip-flops 166 and 173 to a normal or zero condition. Thereafter, information bits are applied to each of the flip-flops 173; preferably in parallel, an add-in pulse is applied to an add pulse line 179. Depending upon whether a carry voltage appears on the lead 174, a pulse is or is not gated to the flip-flop 176. Specifically, if a positive voltage is applied to the flip-flop 173 so that a positive voltage is applied to the or gate 163 and a carry voltage does not appear on the lead 174, then upon the application of a voltage to the lead 179, a pulse is gated through the and gate 162 and the state of conduction of the flip-flop 166 is altered. This condition is indicated in Table I by the third line from the top in which the two X's in the 163 and 162 columns indicate that a voltage was passed through both of these gates and the flip-flop 166 was changed to the one state. As indicated in the fourth line, if a carry voltage appears on the lead 174, then each of the gates 162, 161, 163, 168, and 171 is open. Due to the fact that the gate 161 is open, the gate 162 is blocked so that the state of conduction of the flip-flop 166 is not altered. After the original word has been gated into the accumulator, constituting the flip-flop 166, as a result of the application of a pulse to the lead 179, a pulse is again applied to the lead 178 but not to the lead 177 and the flip-flops 173 are again set to a zero condition. The B word is now read into the flip-flops 173 and the line 179 again pulsed. The various combinations of inputs on the A, B, and C lines; that is, the words in the accumulator flip-flop 176, the read-in flip-flop 173 and the carry voltage on the lead 174 are designated in Table I and it is readily seen that the circuit constitutes a complete adder. As indicated above, information to the adder is read-in parallel to the twelve stages with the thirteenth stage being employed to detect a carry. Read out from the adder is accomplished by means of and gates 180, each of which sends a different flip-flop 166 and is pulsed from a read out line 181.

Figure 4:
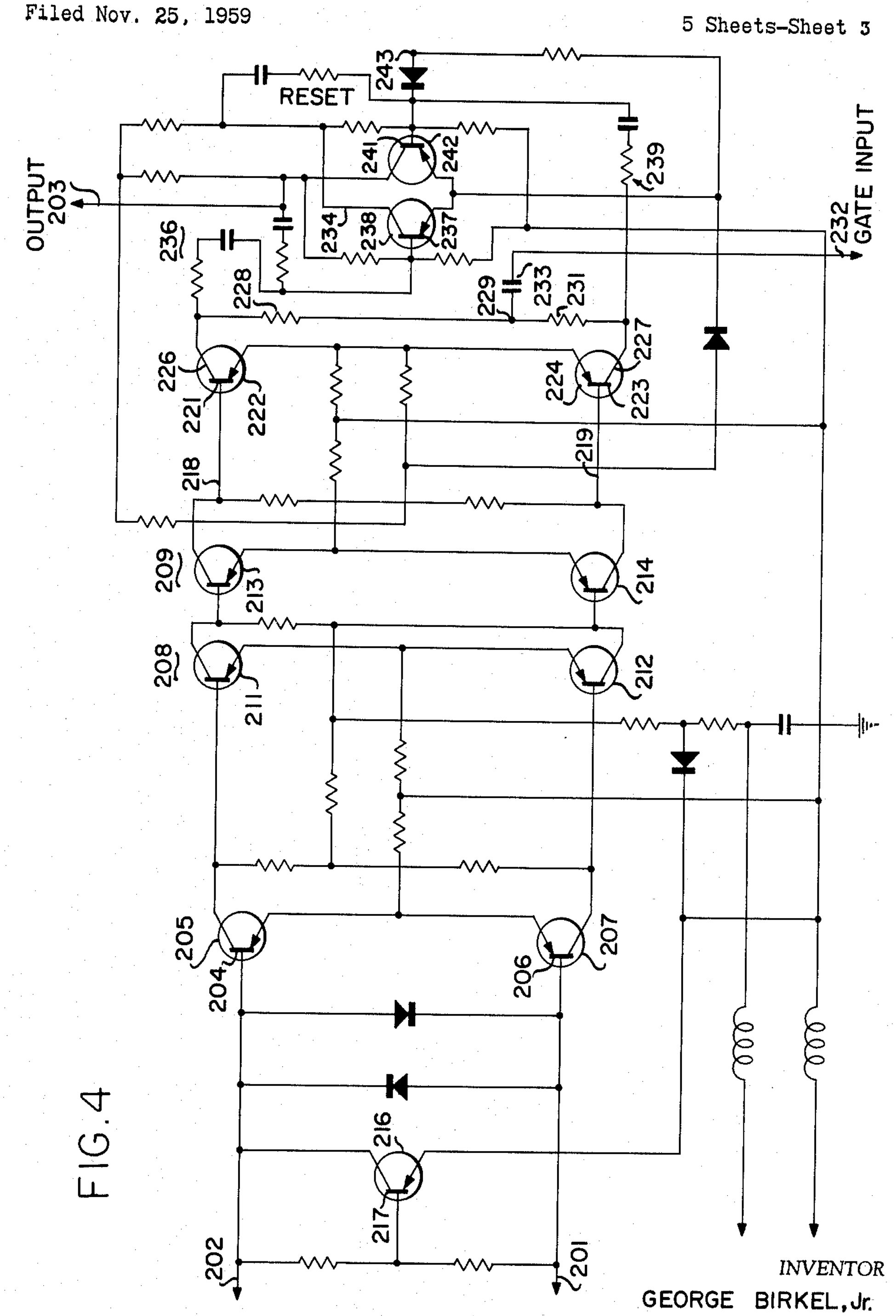
FIGURE 4 is a schematic circuit diagram of an error amplifier comparator which may be employed in various places in the apparatus of the invention.

Referring now specifically to FIGURE 4 of the accompanying drawings there is illustrated an error amplifier which is employed as a comparator in the analog system of the present invention for purposes to be described in the latter figures and also employed as the error amplifier in the digital-to-analog converter described with respect to FIGURE 1 of the accompanying drawings. A reference input voltage is applied to a lead 201 and an input voltage to be compared therewith is applied to a lead 202. It is the purpose of the error amplifier to produce a positive voltage on an output lead 203 in the event that the input voltage is larger than the reference voltage and to produce no output voltage on the lead if the other condition occurs. The lead 202 is connected to a base electrode 204 of the transistor 205 and lead 201 is connected to a base 206 of the transistor 207. The transistors 204 and 207 constitute the active elements of the first stage of a differential amplifier having second and third stages 208 and 209 including transistors 211 and 212 in the stage 208, the transistors 213 and 214 in the stage 209. The collector voltage for the first stages of the differential amplifier is controlled by a transistor 216 which has a voltage applied to its base 217 that is equal to the difference between the input and reference voltages. Thus, the collector voltage applied to the first two stages of the amplifier is controlled by a voltage proportional to the average value of the two input voltages and the differential stages are insensitive to the magnitude of the inputs since the collector voltage varies as a function of these latter quantities.

A first output voltage from the three stage differential amplifier which is proportional to the voltage on the lead 202 is applied to a lead 218 while a voltage proportional to the reference on the lead 201 is developed on a lead 219. The lead 218 is coupled to a base electrode 221 of a first transistor 222 of transistor gate circuit. The lead 219 is connected to the base electrode 223 of a transistor 224 forming the second active element of a transistor gate circuit. The transistors 222 and 224 are provided with collector electrodes 226 and 227 respectively. The collector 226 is connected via a resistor 228 to a junction point 229 while the collector 227 is connected via a resistor 231 to the junction point 229. A gate pulse is applied to a lead 232 and via a capacitor 233 to the junction point 229. It is the purpose of the transistor gate to shunt the clock pulse appearing at the collector of the one of the transistors essentially to ground while passing the clock pulse appearing at the collector of the other transistor to one stage of a flip-flop 234 to trigger the flip-flop into one state or the other state of conduction in accordance with which of the transistors is conductive. Specifically, the collector 226 is coupled through an RC network 236 to a base electrode 237 of the transistor 238 forming one of the active elements of the flip-flop 234. The collector 227 is coupled through an RC network 239 to a base electrode 241 of a second transistor 242 of the flip-flop. The flip-flop 234 is set by a reset pulse on lead 243 such that the transistor 242 is conductive and, in consequence, at the beginning of each operation, a high gating voltage appears on lead 203. The parameters of the circuit are such that when a voltage is applied to the lead 218 which is greater than the voltage applied to the lead 219 by even a small amount, the transistor 222 is rendered highly conductive and the transistor 224 is rendered substantially non-conductive. In such a case, the pulse applied to the lead 232 follows a first path to the collector electrode 226 and is shunted through the highly conductive transistor 222 to the base circuit and thence through various components to ground. On the other hand, a clock pulse which appears on the collector 227 of the non-conductive transistor 224 is not shunted to ground and proceeds through the RC network 236 to the base electrode 237 of the transistor 242. The transistor 242 is already conductive and therefore, is unaffected by this pulse. If, however, the voltage on lead 218 is less than the voltage on lead 219 the transistor 222 is non-conductive and the transistor 223 is conductive, a pulse applied to lead 232 is now applied to transistor 238 and renders it conductive; as a result, the gating voltage is reversed from the lead 203.

The basic clock pulse rate for the computer is supplied by a two megacycle per second oscillator (not illustrated) which produces a clock pulse every half microsecond. A complete cycle of operation; that is, the time required for a unit of analog input information to be completely processed through the machine and to emerge as another unit of analog information, requires about 42 microseconds and in order to permit appropriate handling of this information, the basic cycle of the apparatus is set at 50 microseconds. In consequence, the clock pulse generator is adapted to produce one hundred clock pulses not all of which are utilized in the embodiment of the invention described. Although the basis recycling rate of the machine is fifty microseconds, approximately forty microseconds are required to perform an analog-to-digital conversion and therefore, it is necessary in order to maintain the basic recycling rate to perform other operations in the apparatus during the interval when an analog-to-digital conversion takes place.

Figure 5:
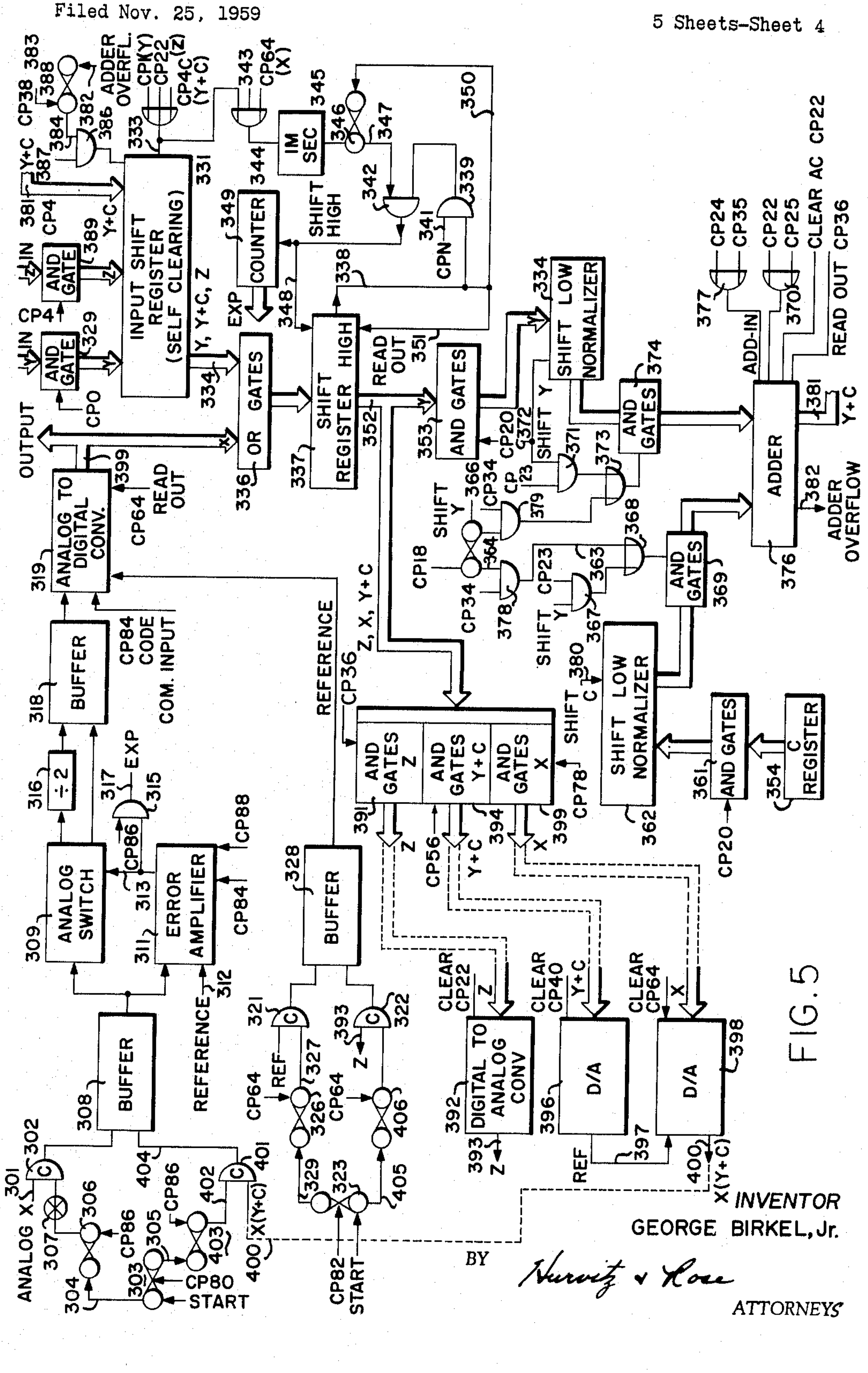
FIGURE 5 is a schematic block diagram of the real number section of the computer of the invention.

Referring now specifically to FIGURE 5 of the accompanying drawing, there is illustrated a schematic block diagram of the system for operating upon the numeric or real number portions of each computer word. In this figure, the double line connections having large arrowheads indicate the flow of binary coded words in parallel while single line connections indicate the flow of analog information or the flow of clock pulses employed to control various gating functions. The cycle of operation of the computer nominally starts with the CP 0 pulse. However, analog information is gated to the computer by the CP 80 pulse of the preceding cycle of operation so that an analog-to-digital conversion is already in process when the CP 0 pulse indicating the nominal start of a cycle is generated. Analog information appears on a lead 301 which is employed as one input to a current gate 302 of the type illustrated in FIGURE 1. A clock pulse CP 80 is applied to a flip-flop 303 having an output lead 304 connected to trigger a further flip-flop 306. The flip-flop 303 is initially set to a correct state with the left stage conducting by a start pulse so that, when the first CP 80 pulse appears, a pulse is disclosed on the lead 304. A start pulse is generated when the apparatus is initially turned on. The flip-flop 303 applies a positive pulse in alternate cycles to the leads 304 and 305 so that in the specific embodiment of the invention employed to solve the previously stated equation $$\frac{X(Y+C)}{Z}$$

the X analog voltage is gated to the system through gate 302 during one cycle and the $X(Y+C)$ signal is gated to the system during the next cycle. The pulse produced on lead 304 by the flip-flop 306 is amplified by a driver amplifier 307 and applied to the gate 302. Therefore, at approximately the time of the CP 80 clock pulse the analog voltage X is gated through the gate 302 and through a buffer 308 to an analog switch 309. The analog voltage is also applied through the buffer 308 to an error amplifier 311 of the type illustrated in FIGURE 4 of the accompanying drawings. The error amplifier is applied with a reference voltage via a lead 312 against which the analog input signal is to be compared and depending upon whether the analog voltage is greater or lesser than the reference voltage, a positive gating voltage is maintained on or is removed from a lead 313. The analog switch is conditioned by the positive voltage normally appearing on the lead 313 to pass the analog voltage X to a divide by two circuit 316 and if the analog voltage is greater than the reference voltage on lead 312, the analog switch remains in this condition. If, however, the voltage on lead 312 is greater than the analog voltage X, the switch 309 passes the analog voltage directly to a buffer amplifier 318 which also receives the output voltage from the circuit 316. The CP 84 pulse is employed as the gate input pulse and the CP 88 pulse is employed as the reset pulse to the amplifier 311. The condition of the gating voltage on the lead 313 is determined by an and gate 315 at time CP 86 and if the lead 313 has a positive voltage thereon and a positive voltage appears on an output lead 317 from the gate 315. This pulse is directed to the exponent section of the computer as will be explained subsequently.

The analog voltage is now applied through the buffer 318 to an analog-to-digital converter 319 of the type illustrated in FIGURE 1 of the accompanying drawings. The reference voltage applied to the converter 319 must be selectable between a fixed reference value applied as one input to a current gate 321 of the type illustrated in FIGURE 1 and a voltage representative of the quantity Z which is applied to a current gate 322. If the reference voltage applied to gate 321 is gated to the converter 319, a voltage is produced at the output of the converter which is the binary coded equivalent of the input voltage applied to the lead 301 whereas if the Z quantity is gated to the converter 319, the output voltage from the converter is equivalent to the analog quantity applied to the converter divided by the quantity Z. The application of the correct reference voltage to the converter 319 is determined by a flip-flop 323. The flip-flop 323 is initially set by the start pulse to apply a low voltage on a lead 324 and upon the application of the first CP 82 pulse to the flip-flop 323, a positive pulse is applied via the lead 324 to a further flip-flop 326. The pulse applied to lead 324 sets the flip-flop 326 so that a positive output voltage appears on a lead 327 and gates the reference voltage through the gate 321 and a buffer amplifier 328 to the converter 319.

A clock pulse 84 is applied to the code command input of the converter 319 and a conversion operation commences. The operation proceeds for slightly less than forty microseconds so that the information in digital form is available at clock pulse CP 64 which is applied to the read-out lead of the converter 319.

Prior to this time and at the beginning of the first full cycle of operation, the clock pulse CP 0, which occurs at ten microseconds after the clock pulse CP 80 applied to the flip-flop 303, is applied to a set of and gates 329 which pass binary coded pulses representative of an input quantity Y, to a self-clearing input shift register 331. Clock pulse CP 1 is applied through an or gate 332 to read-out lead 333 of the shift register 331 so that at this time the Y information is applied to a set of output leads represented generally by the broad arrow 334 and through a series of or gates 336 to a shift register 337. The shift register 337 is employed to shift high any word stored therein; that is, to shift the number through the register until a "one" appears at the most significant digit location of the register. The shift register 337 is provided with an output lead 338 which senses the state of the last stage of the register 337 in which is stored the most significant digit of the number and the voltage on this lead is employed as an inhibitor input to an inhibit gate 339. When the last stage of the register 337 has a zero stored therein, no voltage appears on the output lead 338 and the gate 339 is permitted to pass clock pulses applied thereto via a lead 341. All clock pulses are applied to the lead 341, this being designated by CPN so that, when the last stage of the counter 337 has a zero stored therein, all clock pulses are passed through the gate 339 to a further and gate 342. The clock pulse CP 1 passed through the or gate 332 to the read out lead 333 of the shift register 331 is also applied through an or gate 343 to a delay line 344 and through the delay line to a flip-flop 346. The application of a pulse to the flip-flop conditions it so that a positive voltage appears on an output lead 347 therefrom which is employed as a second input lead to the end gate 342. Thus, upon the occurrence of the pulse CP 1, the flip-flop 346 is set so as to permit pulses to pass through the gate 342 if pulses are also gated by the inhibitor gate 339. If a zero is stored in the most significant digit stage of the shift register 337, clock pulses are passed through the gate 342 and are applied to a shift lead 348 of the shift register 337 which causes the information stored in the register to be shifted high. The pulses appearing on the lead 348 are also applied to a binary counter 349 which provides a count in the binary form of the number of pulses appearing on the lead 348 and this information is employed in the exponent section which performs computations relating to the exponents of the various quantities applied to the system.

When the information stored in the shift register 337 has been shifted to the extent required to develop a "one" in the most significant stage of the register 337, a positive voltage appears on the lead 338 thereby inhibiting the passage of clock pulses through the gate 339 and prevents further shifting of the number. The appearance of a positive voltage on the lead 338 effects resetting of the flip-flop 346 via a lead 350. The lead 338 is also connected to a read-out lead 351 of the shift register 337 so that the information stored therein is now gated to a set of output leads 352.

Reviewing the operation of the shift register 337 and the circuits associated therewith, upon the application of the binary coded digits of the quantity Y thereto, the digits are shifted to the right in the shift register on a pulse-by-pulse basis until the most significant digit of the number appears in the most significant stage of the shift register 337 at which time the information is gated out. Concurrently, with the shifting of the Y information toward the most significant digit stage of the register, a count is recorded in the counter 349 which indicates the number of shifts required to effect the desired result. Since each shift of a binary number less than one toward its binary point effects a multiplication by 2, the number in the counter 349 is the negative exponent of the base 2 for that number.

The information appearing on the output leads 352 of the shift register 337 is applied to individual and gates 353 and is gated through the and gate 353 to a shift register 334 by clock pulse CP 20.

Figure 6:
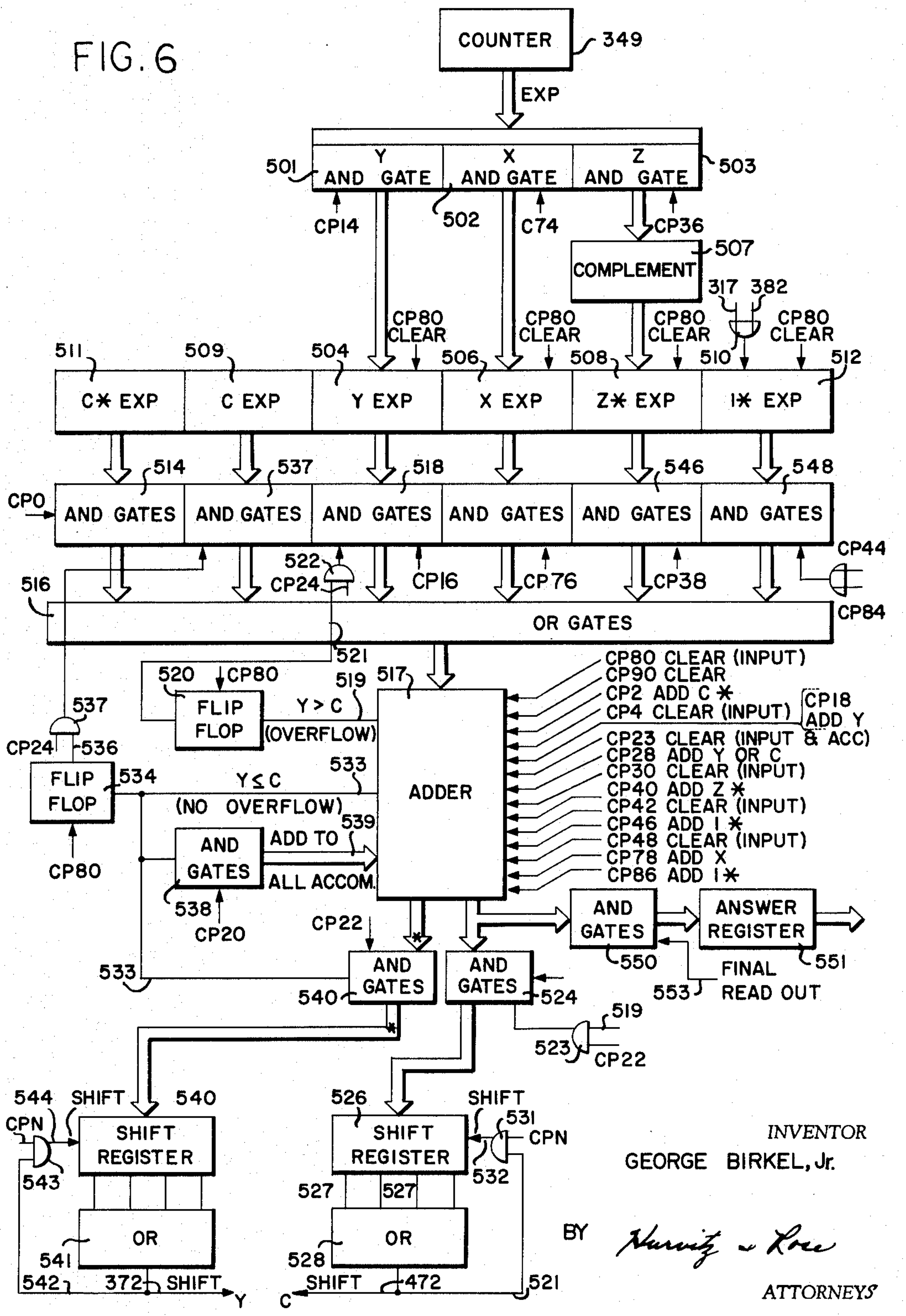
FIGURE 6 is a schematic block diagram of the exponent section of the present invention.

The quantity Y is now to be added to a system constant C which is stored in a register 354. However, before the quantities C and Y can be added, one of the quantities must be shifted relative to its binary point in order to bring the exponents into agreement since obviously numbers having different exponents cannot be added directly. Therefore, prior to the performance of the addition of Y to C, a determination must be made of which of the two quantities is to be shifted and how many shifts are required to bring the exponents of the two quantities into agreement. In the system illustrated, if the exponents of the two quantities are not in agreement, the quantity having the smaller negative exponent is shifted low; that is, the one is shifted away from the binary point and the shifting continues until the exponents are in agreement. The apparatus for determining whether the exponents are in agreement and if not which of the numbers is to be shifted is illustrated in FIGURE 6 which apparatus performs all operations upon exponents. In response to a determination made by this apparatus, a series of pulses is applied to a shift C lead if the C word is to be shifted and to a shift Y lead if the Y word is to be shifted. The number of pulses applied to each of these leads is equal to the number of shifts required to bring the two exponents into agreement.

Proceeding with the description of the actual operation of this portion of the circuit, clock pulse CP 20 is applied to the and gate 353 to shift the word appearing on the output leads 352 of the shift register 337 into a shift low register 334 and the pulse is also applied to a set of and gates 361 to shift the C word in the register 354 into a shift low register 362. If the C word is to be shifted low a series of pulses appears on the shift C lead connected to the shift lead of the register 362 to effect shifting therein. A flip-flop 363 is initially set by clock pulse CP 18 to apply a positive voltage to a lead 364 and if shift C pulses are received, the flip-flop remains in the state as determined by the CP 18 pulse. However, if shift Y pulses are received, the flip-flop changes its state of conduction and applies a positive gating voltage to an output lead 366. The shift Y pulses are also applied to an and gate 367 so as to gate a clock pulse 23 which is applied through an or gate 368 to a set of and gates 369. The CP 23 pulse is also applied to an inhibitor gate 371 which receives inhibiting pulses from the shift Y leads via a lead 372 which also applies shift pulses to the register 334. If shift Y pulses are received, the CP 23 pulse is not passed by the inhibition gate 371 but if shift Y pulses are not received the CP 23 pulse is passed through the inhibitor gate 371 and through an or gate 373 to a set of and gates 374. The and gates 374 are employed to gate the Y word from the shift low register 334 to an adder 376. Therefore, if shift C pulses are received, a gating pulse is applied to the gates 374 and the Y word is gated to the adder. If the shift Y pulses are received, the shift Y pulses gate the CP 23 pulse through the and gate 367 and or gates 368 to the and gate 369 which gate the C word from the register 362 to the adder 376. Thus, depending upon which word is to be shifted, the other word is immediately applied to the adder and is added into the adder by means of an add-in pulse CP 24 gated through an or gate 377. Specifically, the clock pulse CP 24 is applied to the or gate 377 and the output lead of the gate is connected to the add-in lead of the adder. Immediately prior thereto, the CP 22 pulse is applied to the clear accumulator lead of the adder through or gate 370 so that the adder is prepared for reception of the incoming word. Thus, the adder 376 is cleared by CP 22 and the first word fed to the input register of the adder at CP 23 is shifted into the accumulator by the clock pulse CP 24. If a shift C condition existed, the Y word is gated to the adder at time CP 23 and, at the end of the shift cycle, which occurs a maximum of twelve clock pulses later, the shifted word is read out by clock pulse CP 34. The clock pulse 34 is gated through an and gate 378 by the positive voltage which appears on the lead 364 when a shift Y condition prevails and proceeds through the or gate 368 to the and gate 369 which gate the C word into the adder 376. The input register of the adder 376 is cleared by a clock pulse CP 25 which proceeds through the or gate 370 to ready the adder for the word which is gated in by the clock pulse CP 34. If a shift Y condition exists, and therefore the C word was read into the adder at time CP 23, then the CP 34 pulse is gated through an and gate 379 by the positive voltage appearing on the lead 366 from the flip-flop 363 and proceeds through the or gate 373 to the and gate 374 thereby gating the Y word to the adder. Add in pulse CP 35 is applied to the adder 376 through the or gate 377 thereby completing the addition. The circuitry thus far described takes care of the conditions when there is a shift C or a shift Y pulse or pulses applied to the appropriate lead. In the event that the exponents of the two words are of equal value, the machine must have a built-in preference for shifting one of the words in first and thereafter shifting the other word in. In the circuitry employed, the Y word is shifted in first and thereafter the C word is shifted in. Specifically, if no Y pulses appear, the flip-flop 363 remains in the condition established by clock pulse 18. Under these conditions, an inhibit pulse is not applied to the inhibitor gate 371 so that the CP 23 pulse is gated through the and gate 371 and or gate 373 to the and gate 374 which gate the Y word to the adder. The CP 34 pulse is gated through the and gate 378 by the voltage on lead 364 and opens the gates 369 so that the C word is gated to the adder 376.

The clock pulse CP 36 gates the sum of $Y+C$ out of the adder 376 to output leads 381 which are connected to the input register 331. The numeric portion of the computer word has twelve bits, and if a carry is generated by the last stage of the adder 376 indicating an overflow condition, the register 331 must have an additional stage to accept this information and thereafter permit the word to be shifted low so that the most significant digit of the quantity $Y+C$ appears in the proper stage of the register. This is accomplished by applying the overflow bit which appears on a lead 382 to a thirteenth stage of the register 331 and also to a flip-flop 383 which, when set by the overflow digit on the lead 382, establishes a positive voltage on its output lead 384. The output lead is connected to an input lead of an and gate 386 which has another input lead 387 connected to receive clock pulse CP 38. The output circuit of the and gate 386 is connected via a lead 388 to a shift low input of the shift register 331 so that if an overflow bit is produced by the adder the CP 38 pulse is gated through the and gate 386 and shifts the word to one position to the low side of the shift register 331. The flip-flop 383 is reset by the pulse on lead 388. As will appear subsequently, the overflow bit appearing on lead 382 is also applied to the exponent portion of the system to decrease the negative exponent of the $Y+C$ term.

During the interval provided for the addition of Y and

C, the Z word is gated into the input shift register 331 through a set of and gates 389. The Z word is gated through the and gates 389 by a clock pulse CP 4 and is thereafter gated through the or gate 336 to the shift register 337 by the clock pulse CP 22. A normalizing function is now performed by the shift register 337 and its associated circuits and the Z word is applied via output lead 352 of the shift register 337 to a set of Z and gates 391. At clock pulse CP 36, the Z word is gated through the gate 391 to a digital-to-analog converter 392. The digital-to-analog converter 392 is cleared by a clock pulse CP 22 and, upon the occurrence of the clock pulse CP 36, the Z word in digital form is stored in the input register, flip-flops 153 to $\mathbf{153_n}$ of the digital-to-analog converter 392 of FIGURE 2 and concurrently therewith the analog equivalent of this word appears on an output lead 393 of the converter 392.

As previously indicated, the $Y+C$ word is read out to the input shift register 331 by the CP 36 pulse and is gated to the shift register 337 by clock pulse 40 which is applied through the or gates 332 to the read-out lead 333 of the shift register 331. This shift register 337 and its associated circuits now proceed with a normalizing subroutine which is completed prior to the occurrence of clock pulse CP 56. The $Y+C$ word which now appears on the output leads 352 of the register 337 is gated by the CP 56 pulse through a set of and gates 394 to a digital-to-analog converter 396. The digital-to-analog converter 396 is cleared initially by clock pulse CP 40 so that when the clock pulse CP 56 is applied to the and gate 394, the digital-to-analog converter 396 is ready to receive a new word. The output voltage developed by the digital-to-analog converter 396 appears on a lead 397 which is connected to the reference potential lead of a digital-to-analog converter 398. Therefore, the $Y+C$ voltage is applied to the converter 398 such that this voltage is multiplied by the quantity applied to the converter, or more specifically, the quantity X.

Four microseconds or eight clock pulses after the $Y+C$ word is gated to the converter 396, the analog-to-digital conversion being performed by the converter 319 is completed and the digitized answer is read out of the converter by clock pulse CP 64. The digital pulses are applied to a set of output leads 398 which are connected to the or gate 336 and therefore, are applied directly to the shift register 337. The shift register 337 and its associated circuits again perform a normalizing function and the output word from the shift register 337 is supplied via leads 352 to a set of X and gates 399. The pattern of pulses appearing on the lead 352 are gated through the X and gate 399 by clock pulse 78 and are aplpied as the digital input to the digital-to-analog converter 398. As a result of the fact that the $Y+C$ quantity is applied to the digital-to-analog converter 398 as a reference voltage, an output quantity $X(Y+C)$ appears on an output lead 400 of the converter 398.

In order to complete the operation; that is, to derive the quantity $$\frac{X(Y+C)}{Z}$$

it is merely necessary to employ the numerator appearing on lead 400 as the voltage input to the analog-to-digital converter 319 and to couple the Z quantity appearing on output lead 393 of the digital-to-analog converter 392 to the reference lead of the analog-to-digital converter 319.

Proceeding with the description of the portion of the circuit for accomplishing the above result, the lead 400 is connected to one input circuit of an and gate 401 having a second input circuit connected via a lead 402 to a flip-flop 403. The flip-flop 403 receives a triggering pulse from the flip-flop 303. It will be remembered that the flip-flop 303 is alternately changed from one state of conduction to the other by the CP 80 pulse which, during the first cycle of operation opens the and gate 302 via flip-flop 306 and during the second cycle of operation opens the and gate 401 via flip-flop 403 which is reset by the CP 86 pulse. The output voltage gated through the gate 401 is applied via a lead 404 to the buffer 308 and thence proceeds as previously indicated to the analog-to-digital converter 319. The Z quantity appearing on the lead 393 is now applied to the and gate 322 which has a gating voltage applied thereto from a flip-flop 406 which is triggered by a pulse from the flip-flop 323 via lead 405. The flip-flop 323 is alternately shifted from one state of conduction to the other by the clock pulse CP 82 and during the first cycle of operation applies a positive voltage to the lead 324 and during the second cycle of operation applies a positive voltage to the flip-flop 406 so as to open the and gate 322. The Z quantity appearing on the lead 393 is now gated through the and gate 322 and through the buffer 328 to the reference voltage lead of the analog-to-digital converter 319. The conversion function begins with the application of clock pulse CP 84 to the analog-to-digital converter and the final quantity $$\frac{X(Y+C)}{Z}$$

is gated to the output leads 399 by the clock pulse CP 64. The quantity $$\frac{X(Y+C)}{Z}$$

appears on output leads 399 from the converter 319 and also on leads 407. Preferably the final answer is taken from the leads 407 but if desired may be applied to the shift high register 337 for a first normalizing operation. The former procedure is preferred since it is more conservative of time. Even though in the present example of operation this extra time is not required, in other more complicated problems it may be.

It will be noted that the analog-to-digital conversion process is the most time consuming and, whenever possible, input information to the machine should be in digital form so as to avoid as many pure conversions as possible while permitting ready access to the converter for division. However, where necessary, all input information may be in analog form, in which case, the buffer 308 may be connected by a time-division multiplier to receive various input quantities. Since each conversion requires approximately only forty microseconds, the change of conditions in the apparatus under control of the computer is normally so small as to be insignificant and the inaccuracies introduced are within the measurement error of the condition sensing tranducers.

Proceeding now to a description of the operation of the exponent section of the computer, reference is made to FIGURE 6 of the accompanying drawings. The binary number developed in the counter 349 of FIGURE 5 is applied in parallel to and gates 501, 502 and 503. The gates 501 pass information stored in the counter 349 to a Y exponent register 504, and the and gates 502 gate information to an X register 506. The information gated through Z and gates 503 is applied to a complementer circuit 507 which produces the true two's complement of the number applied thereto and the output of the complementer 507 is applied to a Z complement exponent register 508. In addition to the Y, X and Z complement registers 504, 506 and 508, respectively, there is provided a C exponent register 509, a C complement exponent register 511, and a "one" complement exponent register 512 which receives pulses from the comparator or error amplifier 311 via and gate 315, lead 317 and an or gate 510 (see FIGURES 5 and 6).

During the course of operation of the circuit, the register 504 will have either a zero or a negative number stored therein, the latter condition resulting from the fact that in order to normalize a number successive multiplications by 2 are effected which require successive additions of a negative one to the exponent of the number so that the number retains its original value. Preferably, the quantity C has either a zero or negative exponent in order to simplify future operations but the invention is not limited to such a condition. The registers 508 and 512 have the complements of the Z and 1 expondents, respectively, stored therein so that subtraction of these exponents from the Y or C exponent may be effected by addition. The Z exponent must be subtracted from the Y or C exponent since the Y and C terms are divided by Z. The one exponent also is subtracted from the Y or C exponent since its sign is positive indicating a division of X by 2, while the Y and C exponents are negative. The one complement register 512 is a twelve-stage, reversible binary counter which has all stages set to zero by clock pulse CP 80. Under these conditions, the counter may be considered to have the binary number 212 stored therein so that if a single count is applied to the reverse count lead of the register "one" is subtracted from the count and the number stored in the register is the two's complement of the applied number. Consequently, if the voltage applied to the analog switch 309 is directed through the divide-by-2 circuit 316, the complement of one is stored in the register 512. The register 512 also receives a reverse count pulse from the lead 382 of FIGURE 5 via the or gate 510 so that when the $Y+C$ term of equation is shifted low in the register 331; that is, divided by 2, a one is effectively added to the exponent of $Y+C$, or specifically, the negative exponent is reduced by one when the contents of register 512 is added to the contents of the Y or C register. The C exponent register 509 has the C expondent stored therein permanently since this quantity is a constant of the circuit. Similarly, this C complement exponent is permanently in the register 511 although it is to be understood that if, for some reason, the values of the exponents must be changed to accommodate a change in system constant, such may readily be accomplished. Each of the registers 504, 506, 508 and 512 are cleared by a CP 80 pulse so that all zeros are stored in these registers at the beginning of each cycle.

The clock pulse CP 0 is applied to an and gate 514 which gates the C complement exponent stored in the register 511 through a series of parallel or gates 516 to an adder 517 of the type illustrated in FIGURE 3. The adder 517 previously had its input register cleared by a clock pulse CP 80 and its accumulator register cleared by a clock pulse CP 90 for purposes to become apparent subsequently. A clock pulse CP 2 is applied to the adder to add the C complement exponent into the accumulator and a clock pulse CP 4 clears the input register. A clock pulse CP 14 is applied to the and gate 501 so that the number stored in the counter 349 at this time is gated to the Y exponent register 504. A clock pulse CP 16 is applied to a set of and gates 518 which pass the information in the register 504 to the or gates 516 and thence to the adder 517.

It will be noted that the C complement's exponent was applied initially to the adder and, in consequence, when the Y exponent is added to the C complement exponent by a clock pulse CP 18, an answer is produced which is equal to the difference between the C and Y exponents, the utilization of the C complement exponent permitting a subtraction to occur by the addition of complements. The subtraction of the C and the Y exponents permits three conditions to arise; where Y is greater than C, Y and C are equal, and C is greater than Y. In the first instance; that is, where Y is greater than C, the adder produces an overflow bit indicative of this condition and this bit is applied via a lead 519 to a flip-flop 520 which stores this condition. When an overflow bit occurs on the lead 519, the flip-flop 520 develops a positive voltage on an output lead 521 which is applied as one input voltage to an and gate 522. A clock pulse CP 24 is also applied to the and gate 522, the output circuit of which is connected to and gate 518. In consequence, if Y is a larger negative number than C at the time determined by clock pulse CP 24, the number in the Y exponent register 504 is again shifted through the or gates 516 to the adder which was cleared by the pulse CP 23. The overflow voltage appearing on the voltage 519 is also applied as one input voltage to a further and gate 523 having a second input circuit pulsed by clock pulse CP 22. Thus, if Y is greater than C and a positive voltage appears on the lead 519 at the time of occurrence of the clock pulse CP 22, an output voltage is generated by the and gate 523 and is applied to open and gates 524. The input circuits of the and gates 524 are connected to the flip-flops in the accumulator of the adder and thus, when the gates are open the sum stored in the accumulator is gated to a shift register 526. The shift register comprises a plurality of interconnected flip-flop stages and an output lead 527 is provided from each of the stages of the flip-flop to a set of or gates 528. Thus, if a one appears at any location in the shift register 526, a positive voltage is developed on an output lead 529 from the or gate 528. The lead 529 is connected to one input circuit of an and gate 531, the other circuit of which is adapted to receive all clock pulses from the timing generator. Thus, if a positive pulse appears at any time on the lead 529, a pulse is passed through the and gate 531 and is applied to a shift lead 532 of the shift 526. Whenever a number greater than zero is applied to the shift register 526, a pulse appears on the lead 529 and a number of pulses is gated through the and gate 531 to shift the register 526 through a number of counts required to restore the register to the zero condition. Thus, a number of pulses is developed on the lead 529 equal to the number stored in the shift register 526 and these pulses are employed as the shift C pulses applied to the lead 380 of FIGURE 5 and shift the C number low a number of binary locations necessary to produce agreement between the C exponent and the Y exponent. Since the exponents of the Y and C number now agree, at least so far as the pure numeric portions of the number are concerned, the Y exponent may be and is employed to represent both and therefore, the Y number is gated by the CP 24 pulse to the adder for subsequent operation thereupon by the exponents of various other numbers appearing in the equation being solved.

If the number C is equal to or is greater than Y then no overflow bit or voltage occurs on the lead 519 and instead a voltage appears on a lead 533. The lead 533 is connected to receive a voltage from a flip-flop in the last or thirteenth stage of the accumulator when this flip-flop stores a zero while the lead 519 is adapted to have a positive voltage applied thereto when the last stage of the accumulator stores a one. The voltage appearing on the lead 533 sets a flip-flop 534, which is reset by CP 80, so that it develops a positive voltage on its output lead 536. The output lead 536 is connected to an input circuit of an and gate 537 which has its other input circuit adapted to receive a clock pulse CP 24. Thus, if C is greater than or equal to Y, a positive pulse is passed through the and gate 537 by clock pulse 24 and is employed to open and gate 537 which gates the number stored in the C exponent register 509 to the or gate 516 and thence to the adder 517. In consequence, if C is either greater than or equal to Y, the C exponent is employed as the exponent for the sum $Y+C$.

The number stored in the accumulator at the end of the subtraction of C from Y and sensed by the and gates 524, is not, when there is no overflow into the thirteenth stage of the adder, the true difference between the C and Y exponents but the true number can be derived from the number stored in the flip-flop accumulator. Under the conditions when Y is greater than C, the and gate 524 read the number stored in accumulator as indicated by a chosen tube or transistor of each flip-flop stage of the accumulator and this number is the correct number when the Y exponent is greater than C. However, when the C exponent is greater than Y, the true number cannot be read by the gates 524 but may be derived from the number stored in the other tube or element of each of the accumulator flip-flops, this number being known as the "one's" or flip-flop complement of the number. For example, if the C exponent is equal to 14, which is represented by the binary number 1110 and the Y exponent is equal to 10 which is represented by the binary number 1010, then in order to subtract 14 from 10, the fourteen must first be converted to the two's or true complement which, in the binary notation, is equal to 0010. This latter number is stored in the C complement exponent register 511. Upon addition of the number 10 to the number 2, a number equal to 12 is produced which in binary notation is 1100. Obviously, the addition of these two numbers does not produce an overflow pulse and this is indicative that C is greater than Y. If all ones are now added to the accumulator; that is, to the total of the number stored in the accumulator, a binary number equal to 27 is produced as indicated by the binary notation 11011. If now, the flip-flop or one's complement of this number is taken, the answer is 00100 which is equal to four, the true difference between the original two numbers 14 and 10.

In order to obtain this number from the adder 517, whenever no overflow is produced and a positive voltage is developed on the lead 533, a clock pulse CP 20 is gated through a plurality of and gates 538 and is applied via leads 539 to each flip-flop in the accumulator stage of the adder so as to add all ones to the result, the number now stored in the accumulator being the number 27 in the example given above. A plurality of and gates 540′ are employed to sense the one's complement of the number stored in the accumulator; that is, to sense the individual tubes of the flip-flop opposite to those sensed by the and gates 524. The positive voltage appearing on the lead 533 is applied as one input voltage to each of the and gates 539 which are opened by a clock pulse CP 22. The information thus passed through the gate 540′ is applied to a shift register 540, the individual stages of which are sensed by or gates 541. The or gates 541 produce a positive voltage on the output lead 542 whenever any number greater than zero is stored in the shift register 540 and this lead is connected to one input circuit of and gate 543. Clock pulses CPN are applied to the and gate 543 so that when a voltage appears on the lead 542, pulses are developed on a shift lead 544 of the shift register 540. The operation of this circuit is identical with the operation of the circuit employing the shift register 526, or gates 528 and and gate 531 and the pulses thus developed on the lead 542 are employed as the shift Y pulses in the circuit of FIGURE 5.

The third condition of the relative values of the exponents of Y and C is when these values are equal. In such a case, the number stored in the accumulator of the adder is zero. The addition of all ones to the accumulator produces a number having all ones and the one's complement produces a number having all zeros. In such a case, the number stored in the register 540 is zero and no shift pulses are developed on the shift Y lead 372.

Prior to gating in the Y or C exponent depending upon which is larger, to the adder input register, the input and accumulator registers are cleared by clock pulse 23 so that the adder may receive the exponent at the time designated by clock pulse 24. A clock pulse CP 28 is employed to add the exponent into the accumulator and a clock pulse CP 30 is employed to clear the input register. At the time CP 36, the number stored in the counter 349 gated through the Z and gate 503 to a complementor 507 which applies the complement of the Z exponent to the Z complement register 508. At the time CP 38 a gating pulse is applied to and gates 546 which passes the number stored in the register 508 to the or gate 516 and then to the input register of the adder 517. At a time determined by the clock pulse CP 40, the Z complement number is added to the number in the accumulator; that is, either the number representing the Y or G exponent, so that the exponent now represents the exponent of the real number quantity $$\frac{Y+C}{Z}$$

The overflow bit from the adder, assuming that the number Z is less than the exponent of Y, appears on the lead 519, and if the flip-flop 520 was not previously set to produce an output voltage on the lead 521 it will now do so. However, voltage on the lead 521 is gated through the and gate 522 only by the clock pulse CP 24, and since the flip-flop 520 is reset by a clock pulse CP 80, the system is cleared before the exponent Y can be again gated to the adder 517. The apparatus illustrated in FIGURE 6 does not take into account the condition which would occur if the Z exponent were greater than the Y or C exponent and it is assumed in the example that the parameters of the circuit are such that Y and C exponents will always be greater than Z. It is apparent, however, that if the other condition existed; that is, the Z exponent were greater than the Y exponent, the true exponential number could be derived by the same system that was employed to derive the number when C was greater than Y, and in this case the final number derived from the and gate 539 could be fed back to the Y exponent register 504 along with a thirteenth digit derived from lead 533, indicating a positive exponent. The thirteenth digit can be employed to complement the X exponent fed to register 504 so that the negative X exponent is subsequently subtracted from the exponent in the Y register. If the answer is negative; that is, X is the larger number, the complementary procedure is again undertaken and the derived number stored in the Y register without the thirteenth bit since the number is again negative. If the X exponent is the smaller, the answer is stored in the Y register with the overflow bit from lead 519 indicating that the number is still negative.

Assuming for the purposes of explanation, however, that the Z exponent is less than the exponent Y or C, the number stored in the accumulator of the adder 517 represents the difference between these exponents and the number is stored in the accumulator. The input to the adder is now cleared by a clock pulse CP 42. It will be remembered that when the analog quantity was applied to the analog-to-digital converter 319, if the magnitude of the voltage was too great, it was divided by two by the circuit 316 and an increment exponent signal appeared on the lead 317. The lead 317, when a positive voltage appears thereon, subtracts a count of one from the one complement exponent register 512. Also, if an overflow bit appeared on lead 382 of adder 376, another one is subtracted from the number in the register 512 and the number appearing therein is gated by a clock pulse CP 44 through and gates 548 to the or gates 516 and thence to the input register of the adder 517. Obviously, if the analog quantity was not divided by two by circuit 316 and the adder 376 did not produce an overflow, all zeros would be stored in the register 512. Thus, upon the occurrence of the clock pulse CP 44, all zeros would be applied to the adder 517. A clock pulse CP 46 is employed to add in the contents of the one's complement exponent register to the number in the accumulator and the input of the adder is cleared by a clock pulse CP 48. The apparatus now waits for the completion of the conversion of the quantity X to a digital representation and its application to the shift register 337 for normalization. At the time CP 74, the number appearing in the counter 349 is gated to the X exponent register 506; and at the time CP 76, this number is gated to the adder 517. An add pulse is applied to the adder at the time CP 78 so that the number X is now added to the number stored in the accumulator. The input to the adder is again cleared by the clock pulse CP 80.

At this time in the cycle of operation of the real numbers by the apparatus illustrated in FIGURE 5, the quantity $Z(Y+C)$ has been computed and is applied to the analog-to-digital converter 319 by the clock pulse CP 80. This quantity is applied through the analog switch 309 and the buffer 318 and if the quantity is too great as determined by the amplifier 311, it is divided by two in the circuit 316 and a complement of one is again stored in the one exponent register 512. The error amplifier has concluded its comparison by the time of occurrence of clock pulse CP 82 and thus the exponnet derived therefrom is available for gating to the adder 517 clock pulse CP 84. A clock pulse CP 86 employed to add a one's complement to the number stored in the accumulator of the adder and thus the final exponent answer is available by the time of occurrence of the clock pulse CP 88.

The answer appearing in the accumulator of the adder 517 is not only applied to the and gates 524 but is also applied to a set of and gates 550 which, when gated opened by a "read out" pulse, apply the number stored in the accumulator to an answer register 551 so that the final answer is available in this register at any time thereafter. The answer now appearing in the register 551 may be gated out at the same time that the information is gated out of the computer from the analog-to-digital converter 319 or the digital-to-analog converter 398.

As previously indicated, it may be necessary to multiply the output voltage of the digital-to-analog converters 398 of FIGURE 5 by two in order to bring the quantity produced thereby within the operating range of the apparatus. If the X and $Y+C$ numbers were both one-half then the output voltage from the converter 398 would be below the one-half maximum value permissible. If such is the case, a negative one must be added to the exponent then stored in the accumulator of the adder 517. Ample time for this addition is available during division of $X(Y+C)$ by Z.

It is not intended to limit the present invention to the particular example $$\frac{X(Y+C)}{Z}$$

employed to demonstrate the basic operation of the apparatus. Since the computer of the present application is a special purpose machine, each problem to be solved requires a different configuration of circuit elements. However, regardless of the simplicity or complexity of the problem, the operational procedures as set forth herein are basic to any system employing the concepts of the present invention, particularly with regard to the concurrent performance of various mathematical operations in both the real number and exponent sections of the computer and the flexibility of order in which these operations are undertaken. Specifically, regardless of the problem under consideration, various additions and subtractions and even multiplications can be effected during the interval in which analog-to-digital conversion is performed. Further operations upon the exponents are also performed concurrently with various mathematical operations performed by the real number section and due to the high degree of flexibility of the machine, the operations upon specific exponents do not have to coincide with operations upon the real number component of the same unit of information. As examples of the above propositions, addition of Y and C occurs during conversion of the X quantity and at the same time the Z quantity is being normalized. The subtraction of the one exponent derived as a result of the division of the X quantity at the input is held in abeyance and is not employed until sometime after operations are performed upon the Y and Z exponents neither of which is in existence at the time the "1" exponent is derived. The order in which the various operations occur is highly flexible and is tailored to a specific situation in order to minimize time and circuit complexity or, if these two factors are in contradiction, to achieve the best compromise.

In the exponent section of the machine, the apparatus required to handle the subtraction of a larger number from a smaller number is set forth, and if similar situations arise in the real number section of the machine, the same techniques may be employed. As indicated in the discussion of the exponent section, the sign of such a number may be determined from the overflow condition of the adder after such an operation. Of course, overflow conditions arise under two sets of circumstances, those relating to subtraction as demonstrated in the exponent section and those arising from addition as demonstrated in the real number section with regard to the addition of $Y+C$. It is, of course, essential to determine the nature of the computation which gave rise to the overflow but since subsequent operations upon the number are different, shift in the case of addition and complementing in the case of subtraction. However, the nature of the computation is easily determined by an examination of whether a quantity or its complement is applied to the adder. For example, a flip-flop may be employed to control the flow of the overflow information with the flip-flop being set in accordance with from what registers a complement register or otherwise, the numbers are derived. As previously indicated, the sign of the numbers may be carried as the thirteenth bit in the registers and the designator is altered after subtraction in accordance with the overflow information from the adder.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A hybrid computer for processing units of information in the form of analog electrical signals and digital electrical signals, said computer comprising conversion means for converting information from one of said forms to the other of said forms, said conversion means having an electrical signal input circuit and a reference circuit and producing an output signal which is an arithmetic function of the signals applied to said circuits, means for supplying a first unit of information to be converted to said input circuit, means for supplying a second unit of information to said reference circuit, means for maintaining the magnitude of at least said second unit of information within predetermined limits, said means for maintaining comprising means for selectively multiplying and dividing said second unit of information by a factor such as to maintain said second unit of information within said limits, a means for storing data, means for inserting in said means for storing data a first quantity indicative of said factor and a second quantity related to said first unit of information, and means for adding said first and second quantities when said function of said conversion means is a multiplication function and for subtracting said first and second quantities when said function of said conversion means is a division function.

2. A hybrid computer for processing units of information in the form of analog electrical signals and digital electrical signals, said computer comprising conversion means for converting information from one of said forms to the other of said forms, said conversion means having an electrical signal input circuit and a reference circuit and producing an output signal which is an arithmetic function of the signals applied to said circuits, means for supplying a first unit of information to be converted to said input circuit, means for supplying a second unit of information to said reference circuit, means for maintaining the magnitude of at least said second unit of information within predetermined limits, said means for maintaining comprising means for selectively multiplying and dividing said second unit of information by the radix of said signals raised to a power so as to maintain said second unit of information within either said limits, means for storing a first quantity indicative of said power, means for establishing a second quantity in said means for storing related to said first unit of information, and means for adding said first and second quantities when said function of said conversion means is a multiplication function and for subtracting said first and second quantities when said function of said conversion is a division function.

3. The combination according to claim 2 wherein said digital signals are binary coded signals and said radix is two.

4. The combination according to claim 2 wherein said conversion means constitutes at least an analog-to-digital converter and said function is division.

5. The combination according to claim 2 wherein said conversion means constitutes at least digital-to-analog converter and said function is multiplication.

6. A hybrid computer for processing units of information in the form of analog electrical signals and digital electrical signals, said units of information including a real number portion and a multiplication factor portion constituting the radix of the digital signals raised to a power, said hybrid computer comprising storage means for storing the powers of said units of information, a conversion means for converting said units of information from one of said forms to the other of said forms, said conversion means having an electrical signal input circuit and a reference signal circuit and producing an output signal which is an arithmetic function of the signals applied to said circuits, means for supplying a first unit of information to be converted to said input signal circuit, means for supplying a second unit of information to said reference signal circuit, means for maintaining the magnitude of at least one of said units of information within predetermined limits, said means for maintaining comprising means for selectively multiplying and dividing said one of said units of information by said radix to a power, circuit means for applying a first quantity indicative of said power to said storage means for storage thereby, means for storing a second quantity in said storage means related to the power of the other of said units of information, and means for adding said first and second quantities when said function of said conversion means is a multiplication function and for subtracting said first and second quantities when said function of said conversion means is a division function.

7. The combination according to claim 6 further comprising an output means for said computer and means for applying said units of information to said output means.

8. The combination according to claim 6 further comprising an output means for said computer, and means for separately applying said real number portions and said multiplication factor portions of said units of information to said output means.

9. The combination according to claim 6 further comprising an adder circuit for the real number portions of said units of information, means for sequencing said adder, means for applying the real number portions of said units of information to said adder circuit, and means for operating upon said real number portions to equalize the power of said units of information prior to application of their associated real number portions to said adder circuit.

10. The combination according to claim 6 wherein said radix is 2 and wherein said means for selectively multiplying and dividing further comprises means for multiplying and dividing the real number portions of said digital signals by 2.

11. The combination according to claim 10 wherein said means for selectively multiplying and dividing further comprises means for multiplying and dividing the real number portion of said analog signals by 2.

12. The combination according to claim 6 wherein said radix is two, and wherein said means for selectively multiplying and dividing comprises means for shifting the elements of said real number portions of a unit of digital information until its most significant digit is less than 1 and is adjacent the binary point.

13. The combination according to claim 12 wherein said means for shifting comprises a shift register.

14. A hybrid computer for processing units of information in the form of analog signals and digital signals said computer comprising at least one analog-to-digital converter and at least one digital-to-analog converter, each of said connections having an input signal circuit and a reference signal circuit and an output circuit, said digital-to-analog converter generating in its output circuit a signal proportional to the quotient of the signals applied to its input and reference signal circuits, said digital-to-analog converter generating in its output circuit a signal proportional to the product of the signals applied to its input and reference signal circuits, means for supplying distinct units of information to said input and reference signal circuits of said converters, means for maintaining the magnitude of at least one of the units of information applied to each of said converters within predetermined limits, said means for maintaining comprising means for selectively multiplying and dividing said units of information by the radix of the digital signal to a power, means for storing distinct quantities each proportional to the power related to a different one of said units of information, means for adding the powers related to units of information applied to said digital-to-analog converter to produce the product of said units and means for subtracting the powers related to units of information applied to said analog-to-digital converter to produce the quotient of said units.

15. The combination according to claim 14 wherein the said prescribed limits are the maximum voltage at which said converters are to be operated and one-half of the maximum voltage.

16. The combination according to claim 15 wherein said radix is two and multiplication and division of units of information in digital form is effected by shifting said digital signals relative to their binary points.

17. The combination according to claim 14 wherein all of said units of information are maintained within prescribed limits.

18. The combination according to claim 12 wherein said circuit means includes means for counting the number of binary places the real number portion of the digital signals is shifted.

19. The combination according to claim 4 wherein said means for multiplying includes means for multiplying the output signal of all analog-to-digital conversion means to maintain said signal value within said prescribed limits.

20. The combination according to claim 19 wherein said conversion means further comprises digital-to-analog conversion means and said function includes multiplication, and means for applying only those signals generated by a digital-to-analog converter operating with a reference voltage applied to its reference input circuit to the reference input circuit of an analog-to-digital conversion means.

21. The combination according to claim 15 wherein said means for maintaining maintains all digital signals within said limits to maintain all signals generated by said digital-to-analog converters between said maximum voltage and one-quarter thereof.

22. The combination according to claim 15 wherein said at least one of the units of information is the electrical signal applied to said reference signal circuits only.

References Cited by the Examiner

UNITED STATES PATENTS

| | | | |
|---|---|---|---|
| 2,538,636 | 1/1951 | Williams | 235—159 |
| 3,037,699 | 6/1962 | Lee et al. | 235—154 |

OTHER REFERENCES

Pages 1877 to 1880, October 1957, Palevsky Hybrid Analog-Digital Computing Systems Instruments and Automation, vol. 30.

MALCOLM A. MORRISON, *Primary Examiner.*

LEO SMILOW, *Examiner.*